United States Patent [19]
Allen et al.

[11] Patent Number: 5,485,006
[45] Date of Patent: Jan. 16, 1996

[54] PRODUCT DETECTION SYSTEM FOR SHOPPING CARTS

[75] Inventors: James F. Allen, Peterborough; Paul Rosebush, North York, both of Canada

[73] Assignee: S.T.O.P. International (Brighton) Inc., Peterborough, Canada

[21] Appl. No.: 184,131

[22] Filed: Jan. 28, 1994

[51] Int. Cl.$^6$ .................................................. G08B 13/18
[52] U.S. Cl. ...................................... 250/222.1; 340/568
[58] Field of Search ................................. 250/221, 222.1, 250/561; 340/555, 556, 568, 600; 186/19, 20, 27, 59, 62, 63

[56] References Cited

U.S. PATENT DOCUMENTS

| | | | |
|---|---|---|---|
| 3,457,423 | 7/1969 | Gravely | 250/223 |
| 3,725,894 | 4/1973 | Geisler | 340/280 |
| 3,882,982 | 5/1975 | Smith | 250/222.1 |
| 4,327,819 | 5/1982 | Coutta | 186/62 |
| 4,338,594 | 7/1982 | Holm | 340/568 |
| 4,736,098 | 4/1988 | Rehrig | 250/221.1 |
| 4,868,544 | 9/1989 | Havens | 340/572 |

FOREIGN PATENT DOCUMENTS

| | | |
|---|---|---|
| 2936834 | 4/1981 | Germany. |
| 3217944 | 11/1983 | Germany. |

Primary Examiner—Stephone B. Allen
Attorney, Agent, or Firm—Weingarten, Schurgin, Gagnebin & Hayes

[57] ABSTRACT

This invention relates to an object detection system and device for detecting objects located on storage sections, and in particular a lower storage section, of a moving shopping cart. The system and device comprise a detecting means which detects objects on the storage sections of shopping carts when the shopping cart moves into a predetermined position. The detecting means generates a detection signal if an object is detected. The detecting means operates in response to a trigger signal which is sent from a triggering means. The triggering means is operable to sense at least one, and preferably two parts of the shopping cart when the shopping cart moves into the predetermined position. The triggering means sends the triggering signal when it senses the presence of a cart or other body. The preferred triggering embodiment senses three spaced-apart portions of the cart, to minimize erroneous operation of the system by objects other than a cart of predetermined character.

32 Claims, 7 Drawing Sheets

PRODUCT DETECTION SYSTEM FOR SHOPPING CARTS

BACKGROUND OF THE INVENTION

This invention relates to an object detection system and device, and in particular, to a system and device for detecting the presence of objects in a storage area of a shopping cart.

Shopping carts used in supermarkets generally have storage areas for storing goods which are to be purchased or which have been purchased and are being transported to the exit or parking lot. Shopping carts generally have an upper storage area and a lower storage area located under the upper storage area. The lower storage area is typically used to hold large or heavy items and generally comprises a tray of some kind for easy placement and removal of large and/or heavy items.

One difficulty with shopping carts in general is that as a consumer takes the shopping cart through the checkout aisle, either through inadvertence or intentionally, not all of the goods in the storage areas, particularly the lower storage area, of the shopping cart are brought to the cashier's attention. Accordingly, this leads to some goods not being paid for and the supermarket or grocery store suffering a loss.

In the past, several devices or systems have been used to attempt to detect the presence of objects in the storage areas of shopping carts. In order to accomplish this, some prior art devices have utilized the face that the weight of objects located in the storage sections, and in particular the lower storage section, deflects the tray which forms the lower storage section. These prior art devices utilized devices, such as reflectors, attached to the lower section tray such that a deflection of the lower tray caused by the weight of the object located thereon would move the reflector and be noticed by a sensor located at the checkout counter.

Other prior art devices have detected objects on shopping carts by scanning the storage sections of the shopping carts. However, these prior art devices also required that a triggering device, such a reflector, be applied to each and every shopping cart belonging to a grocery store or supermarket. The reflector in these prior art devices served essentially two functions. Firstly, the reflector permitted these prior art devices to distinguish between shopping carts and other items, such as baby strollers and people, passing in front of the prior art devices. This prevented the prior device from scanning objects other than shopping carts and thereby creating false readings if objects other than goods were detected. Secondly, the reflector permitted the prior art devices to initiate scanning of the shopping cart at the proper time, namely when the shopping cart was properly oriented in front of the scanning device. Furthermore, in some prior art devices, the reflector even helped determine the duration of the scan.

It is apparent that if a monitoring system requires reflectors, or other devices to be placed on each and every shopping cart belonging to a grocery store in order for the monitoring systems to operate, there would be substantial labour and material cost involved in implementing and installing these prior art devices in a grocery store. Furthermore, any changes made to the shopping carts would be readily apparent to consumers. Accordingly, if it is the intention of a consumer to leave the supermarket or grocery store without paying for certain goods, the consumer could attempt to defeat the detection system once the consumer is alerted to its presence.

SUMMARY OF THE INVENTION

Accordingly, it is an object of this invention to at least partially overcome the disadvantages of the prior art. Also, it is an object of this invention to provide an alternative type of object detection device which can distinguish between a shopping cart (and similar devices) and other items or articles. It is also an object of this invention to provide an object detection system which can distinguish shopping carts from other items, such as baby strollers and people, without the need to place any type of device, such as a reflector, on the shopping carts of the grocery store or otherwise alter the shopping carts of a supermarket or grocery store.

Accordingly, in one of its broad aspects, this invention resides in providing an object detection device for detecting objects on a storage section of a moving shopping cart comprising triggering means operable to detect at least two parts of the shopping cart when the shopping cart moves into a predetermined position and to send a trigger signal when the at least two parts of the shopping cart are sensed substantially simultaneously, a detecting means for detecting an object on the storage section of the shopping cart when the shopping cart moves into the predetermined position and operable to receive the trigger signal and wherein the detecting means operates in response to the trigger signal and generates a detection signal if an object is detected.

Another aspect of the invention resides in providing an object detection system for detecting objects on a storage section of a moving shopping cart comprising a triggering means comprising a first triggering detector operable to detect a first part of the shopping cart entering a first area and a second triggering detector operable to detect a second part of the shopping cart entering a second area spatially separated from the first area, a detecting means for detecting an object on the storage section of the shopping cart, wherein when the triggering means detects that the first part of the shopping cart is entering the first area at substantially the same time as the second part of the shopping cart is entering the second area the triggering means causes the detecting means to operate and wherein the detecting means generates a detection signal if the detecting means detects an object.

The present invention provides a solid-state detection combination for detecting the presence of an object located upon a transportation vehicle passing through a predetermined passage, the combination comprising vehicle monitoring means positioned adjacent the passage, in passage monitoring relation, to detect the presence of a vehicle; object monitoring means located adjacent the passage to monitor the vehicle for objects located thereon, and to provide an output signal on detecting the presence of such object; and logic circuit means to enable the output signal, subject to the vehicle monitoring means establishing the presence of a vehicle possessing predetermined characteristics.

In a preferred embodiment the vehicle monitoring means comprises at least two diffuse beam I/R (infra-red) unitary transmitter-receivers, all located on one side of the passage or aisle, wherein the diffuse beam I/R transmitter—receivers may be aimed normal to the passage or aisle, and focussed at less than the full width of the passage or aisle. The receiver portion of the diffuse beam detectors each receives I/R light reflected from the unmodified structure of the cart, thereby avoiding the need for modification to shopping carts that may be used. The spacing between the at least-two I/R detectors may be set in accordance with the structure of the carts in use, so as to register on a standard cart feature, such as a front wheel and a rear wheel, both located on the side of the cart adjacent the detectors.

A third I/R detector may be used, being located relative to the cart structure and the other two I/R detectors, so as to be in registry with a further portion of the cart, such as the frame thereof. The provision in the logic circuit of a slight time delay, such as a quarter of one second within which signal inputs from the I/R detectors may be received, to trigger the object detection circuit, ensures that the I/R "signature" of a passing vehicle is validated as being that of a standard cart of predetermined dimensions. Failure by the logic (vehicle detection) circuit to "recognize" the presence of a vehicle of predetermined dimensions then ensures that the object detection I/R scanner or scanners are not energized. Thus the generation of a false "detection" of an object is avoided, and the integrity of the system is thereby maintained.

In the preferred embodiment the logic circuit means is connected in controlling relation with power supply means for energizing the object monitoring means, the logic circuit means being connected in signal receiving relation with the vehicle monitoring means, to ensure the presence of a vehicle possessing the aforesaid detection characteristics, prior to energizing the object monitoring means.

The aforesaid vehicle monitoring means may include two or more first infra-red detectors, and switch means responsive to the logic means and connected in power supply controlling relation with the object monitoring means.

The aforesaid combination first infra-red detectors are preferably located along the passage in predetermined, mutually spaced relation, sited to register upon predetermined portions of the vehicle/cart, the solid state logic means being interposed in controlling relation between the first detectors and the switch means, the logic means being responsive to the two detectors to activate the switch means when the two detectors register substantially simultaneously on designated portions of the vehicle, to turn the switch means on.

Preferably the logic means includes delay means to ensure sequential actuation of two of the aforesaid vehicle detectors within a predetermined delay period, in order to minimize and substantially avoid erroneous actuation of the system in response to the presence of non-designated objects.

In the aforesaid combination the vehicle monitoring means may preferably include an infra-red detector located adjacent the two first detectors, being connected in simultaneously energized relation with them, and serving to further qualify the triggering object as being a designated, predetermined vehicle.

It will be understood that a simpler embodiment of the present solid state invention may be used incorporated a simplified detection system, while relaying upon alternative output-enabling means such as a magnetic sensitive of other discriminatory means to enable the detector output.

Further aspects of the invention will become apparent upon reading the following detailed description and the drawings which illustrate the invention and preferred embodiments of the invention.

BRIEF DESCRIPTION OF THE DRAWINGS

In the drawings, which illustrate embodiments of the invention.

DETAILED DESCRIPTION OF PREFERRED EMBODIMENTS OF THE INVENTION

Figure 1A:
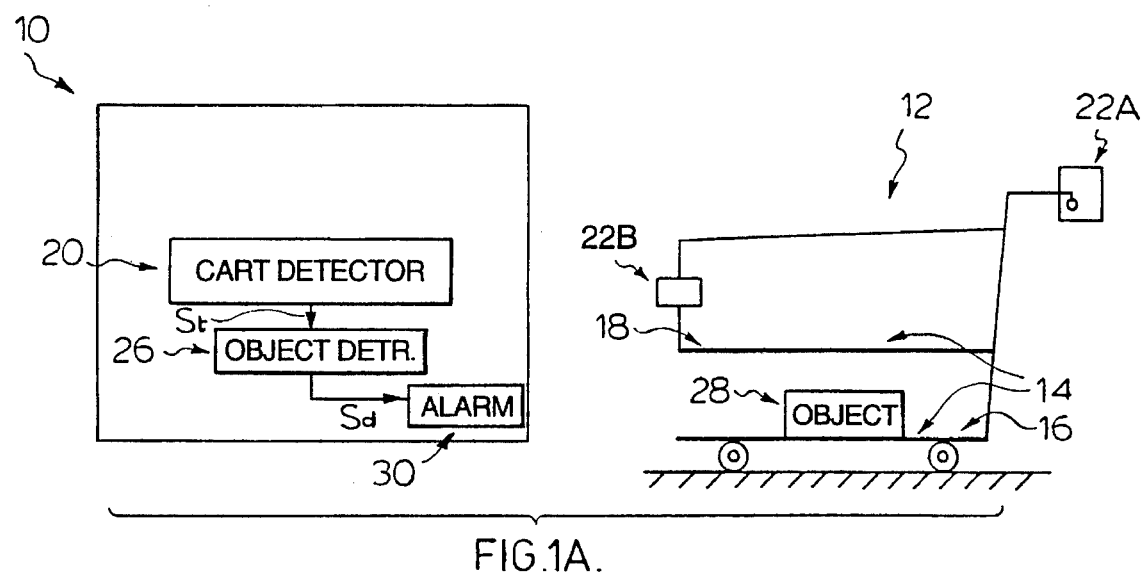
FIGS. 1A, 1B and 1C show side views of a shopping cart and a schematic representation of one embodiment of the present invention.

As shown in FIG. 1A, the present invention, in one embodiment, comprises the device 10. The device 10 has a triggering means 20 which is operable to send a trigger signal $S_t$. The device 10 further comprises a detecting means 26 for detecting an object 28 on a storage section 14 of a shopping cart 12. (It is understood that the term shopping cart 12 in this context refers specifically to a shopping cart as used in a grocery store or supermarket but can include other vehicles or devices used to store and transport objects and goods.) The detecting means 26 is also operable to generate a detection signal $S_d$ if an object is detected.

Figure 1B:
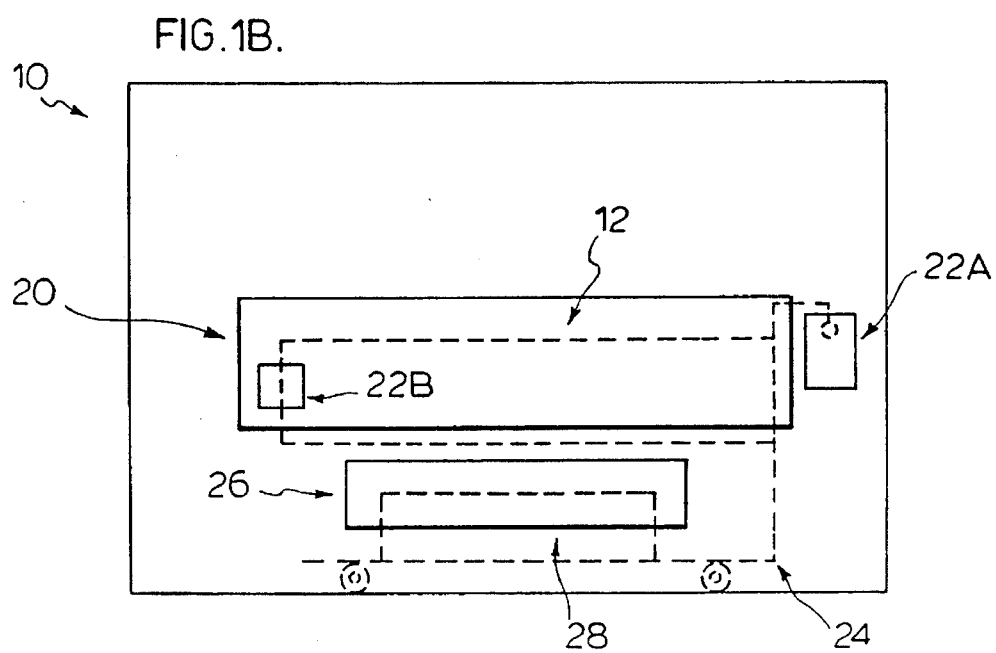

FIG. 1B shows the shopping cart 12 in dotted lines at a predetermined position 24. The triggering means 20 is operable to detect at least two parts of the shopping cart (shown generally in FIG. 1A and 1B as 22A and 22B) when the shopping cart 12 moves into the predetermined position 24. The triggering means 20 sends the trigger signal $S_t$ when the two parts 22A and 22B of the shopping cart 12 are sensed substantially simultaneously.

It should be noted that the at least two parts that trigger the triggering means 20 could be any two parts of the shopping cart 12. It is further understood that there could be more than two parts that trigger the triggering means 20, such as three parts, four parts or more.

The triggering means 20 is operable to sense or detect the at least two parts 22A, 22B of the shopping cart 12 in order to distinguish the shopping cart 12 from other items or articles which may pass in front of the detection device 10. Such other articles or items could be baby carriages, strollers, or people walking in front of the device 10. The possibility that these other articles or items could pass in front of the triggering means 20 such that two parts of these other articles or items would be in a position with regards to the triggering means 20 to fool the triggering means 20 are relatively low. In this way, the device 10 decreases the number of false readings caused by the device 10 being incorrectly triggered by one of these other articles or items and having the detecting means 26 detect objects other than objects 28 on a storage section 14 of a shopping cart 12. Therefore sensing at least two parts 22A, 22B, rather than just one part of the shopping cart 12, increases the reliability of the device 10 by decreasing the chances that other objects or articles could falsely trigger the trigger means 20.

It is typical that all or most of the shopping carts 12 which belong to a particular supermarket or grocery store where the device 10 is installed are of the same general design. The detecting means 26 will not operate to detect objects 28 in storage areas 14 of shopping carts 12 which do not have at least two parts 22A and 22B located in positions which can be detected by the trigger means 20 when the shopping carts 12 are in the predetermined position. Accordingly, the specific settings and dimensions of the device 10 must be customized for the particular shopping carts 12 used by each supermarket or grocery stores in which the device 10 is installed.

In instances where two substantially similar shopping carts 12 are used by a grocery store, similarly located parts of the two different shopping carts, such as the wheels, could be used as the at least two parts 22A, 22B. Alternatively, a first triggering means could be utilized to detect the at least two parts of a first type of shopping cart 12 and a second triggering means could be utilized to detect at least two parts of the second type of shopping cart.

Alternatively, parts could be added to different sized shopping carts so as to simulate the two parts 22A and 22B of shopping cart 12.

It is also preferable that no other two parts of the shopping cart 12 could also be in a position with regard to the triggering means 20 as the at least two parts 22A, 22B when the shopping cart 12 moves across the device 10 thereby fooling the triggering means 20 into generating a false trigger signal $S_{tf}$. To this end, it is preferable that the at least two parts 22A, 22B of the shopping cart 12 are unique in that the sensing of those at least two parts 22A, 22B, and only those at least two parts 22A, 22B, will cause the triggering means 20 to send the trigger signal $S_t$.

Figure 1C:
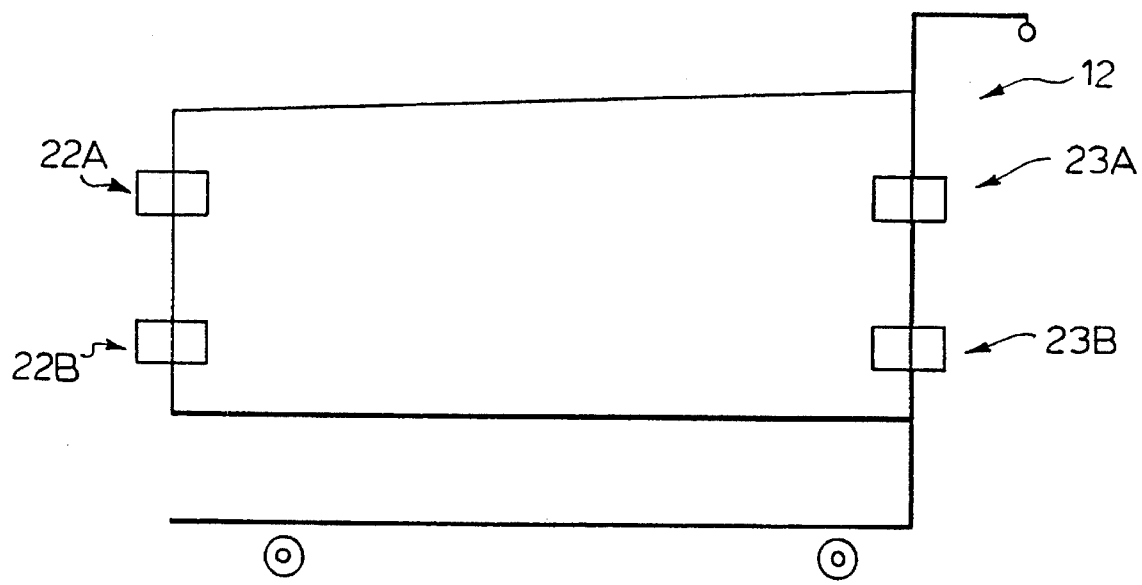

Reference is made to FIG. 1C which shows the two parts 22A, 22B of the shopping cart 12 as being two sections of the front support of the upper storage area 18. While the present invention can operate if the at least two parts 22A, 22B are as shown in FIG. 1C, these parts 22A, 22B are not unique in that two other parts (shown generally as 23A and 23B in FIG. 1C as the rear support for the upper storage area 18) will be in a similar position with regard to the triggering means 20 as the two parts 22A, 22B at some time when the shopping cart 12 moves across the device 10. Therefore, if the two parts 22A, 22B of the shopping cart 12 are as shown in FIG. 1C, it is possible that the triggering means 20 will mistakenly sense the two other parts 23A and 23B and send a false trigger signal $S_{tf}$. If the trigger means 20 does mistake the two other parts 23A and 23B as the two parts 22A and 22B and send a false trigger signal $S_{tf}$, it is possible that the detection means 26 will send a false detection signal $S_{df}$ if the detecting means 26 detects an object. Accordingly, the at least two parts 22A, 22B should be unique.

Figure 2:
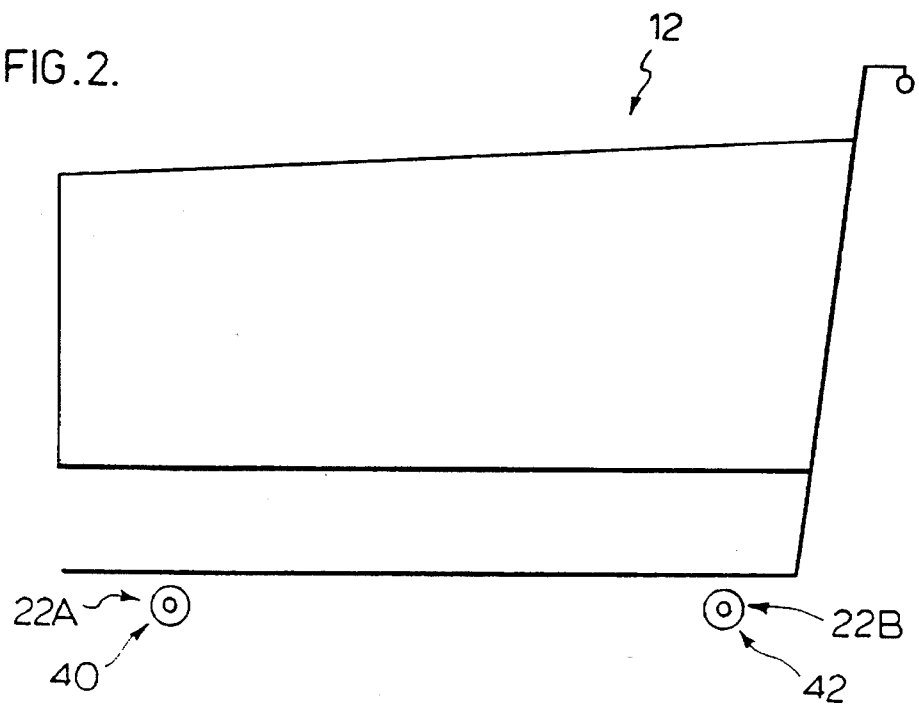
FIG. 2 is a side view of a shopping cart illustrating a preferred embodiment of the present invention.

In a further embodiment, shown generally in FIG. 2, the two parts 22A, 22B of the shopping cart 12 which are sensed by the triggering means 20 are a front wheel 40 and a rear wheel 42. Depending on the nature of the triggering means 20, the front wheel 40 which is sensed could be a front wheel 40 on either side of the shopping cart 12, or only a front wheel on a particular side of the shopping cart 12. Likewise, the rear wheel 22 sensed by the triggering means 20 could be a rear wheel 42 on either side of the shopping cart 12, or a rear wheel 42 on a particular side of the shopping cart 12. Preferably, the front wheel 40 and the rear wheel 42 on the side closest to the trigger means 20 are the parts 22A and 22B.

The triggering means 20 can comprise any type of sensor or detector, such as a photodetector or a tactile sensor, to effect the sensing or detection of the at least two parts 22A, 22B of the shopping cart 12. In the case of a tactile sensor, two tactile sensors could be placed across an aisle to sense the front and rear wheels 40, 42 of the shopping cart 12 as the cart 12 is moved past the tactile sensors.

It is also understood that the present invention could be adopted to detect objects on any of a number of different storage sections 14, such as the lower storage section 16 or the upper storage section 18, or both, depending on the detecting means 26 used. However, it is preferable if the detecting means 26 at least detects objects on the lower section 16 in that it is generally more difficult for cashiers to see objects 28 on the lower section 16.

In a further embodiment of the invention, the device 10 comprises a signalling means shown generally in FIG. 1A as 30. The signalling means 30 is operable to receive the detection signal $S_d$ and to signal to a human operator acting as a cashier that an object 26 has been detected. In a further embodiment, the signalling means 30 comprises a video camera and the signalling means 30 signals that an object 26 has been detected by video taping the object 28 on the storage section 14 upon receiving the detection signal $S_d$. In this way, visual evidence is obtained of the object 28 on the storage section 14.

In a further embodiment of the invention, signalling means 30 comprises an audio indicator, such as a buzzer, or a visual indicator, such as a light bulb, or both an audio and visual indicator in combination. In this embodiment, it is also preferable that the audio and visual indicator remain activated until a human operator deactivates it such as by pushing a button.

Figure 3:
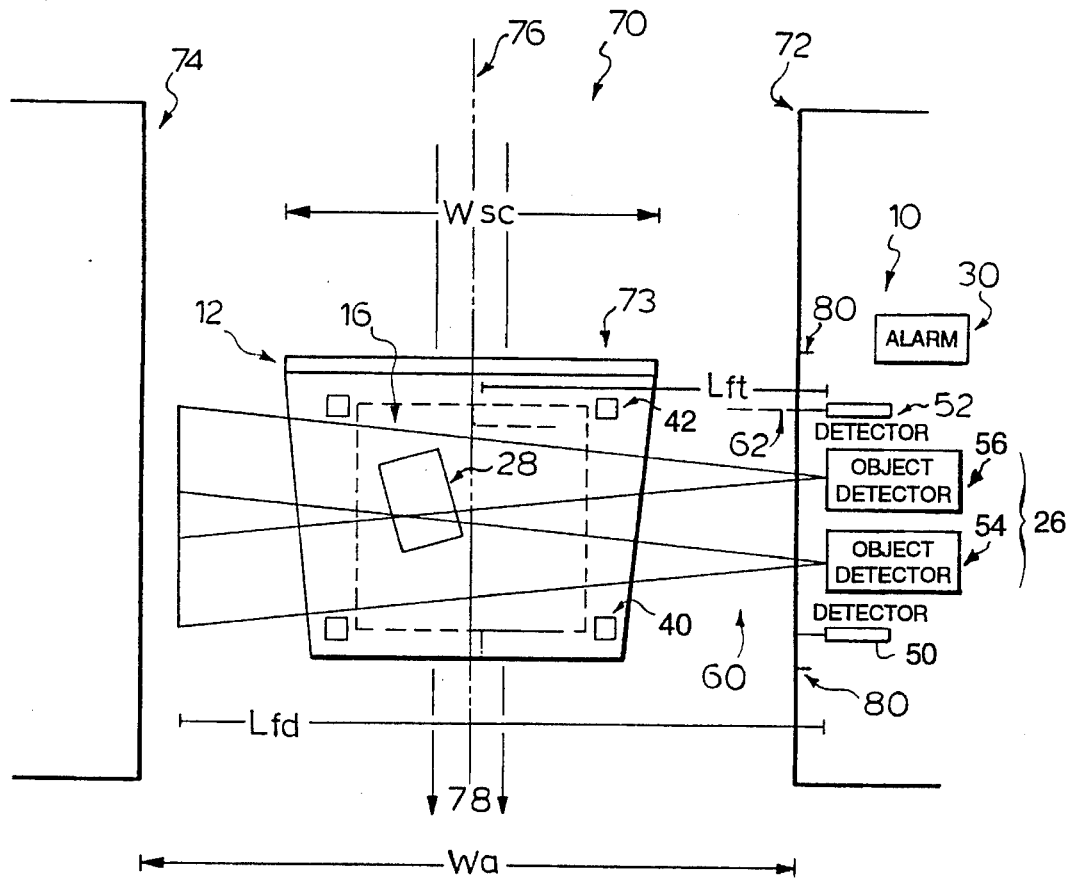
FIG. 3 is a top view of a further embodiment of the present invention.

FIG. 3 shows a preferred embodiment of the invention where two photodetectors act as the triggering means 20. As shown in FIG. 3, a first triggering photodetector 50 and a second triggering photodetector 52 are configured and oriented to detect a front wheel 40 and rear wheel 42, respectively. In this embodiment, the triggering means 20 will generate the trigger signal $S_t$ when the first triggering photodetector 50 and the second triggering photodetector 52 detect the front wheel 40 and the rear wheel 42 substantially simultaneously. This type of arrangement is often referred to as an AND—AND configuration. In this embodiment it is also preferable that the triggering photodetectors 50, 52 be aimed at a point about one to two centimeters above the center of the front and rear wheels 40, 42.

In the system of the present invention, the triggering means 20 can be understood generally as including an embodiment in which triggering means 20 is operable to detect a first part 22A of the shopping cart 12 entering a first area 60 and a second part 22B of the shopping cart 12 entering a second area 62 spatially separated from the first area 60 as shown in FIG. 3. In this embodiment, the triggering means 20 will generate the trigger signal $S_t$, or otherwise cause the detecting means 20 to operate, when the triggering means 20 detects that the first part 22A of the shopping cart 12 is entering the first area 60; substantially at the same time (which is the same as substantially simultaneously) as the second part 22B of the shopping cart 12 is entering the second area 62.

In the embodiment shown in FIG. 3, the first part 22A of the shopping cart 12 corresponds to the front wheel 40 and the second part 22B of the shopping cart corresponds to the rear wheel 42. Accordingly, the triggering means 20 will cause the detecting means 26 to detect objects 28 on the storage section 14 of the shopping cart 12 when the first triggering photodetector 50 detects the front wheel 40 entering the first area 60 and the second triggering photodetector 52 detects the rear wheel 42 entering the second are 62.

In a preferred embodiment of the invention, the detecting means 26 comprises a photodetector 54 for detecting an object 28 on the storage section 14 of the shopping cart 12 when the shopping cart 12 moves into the predetermined position 24. In this embodiment, the first detecting photodetector 54 will operate in response to the trigger signal $S_t$, and the detecting means 26 will generate the detection signal $S_d$ if the first detecting photodetector 54 detects an object 28.

In a further preferred embodiment, the detecting means 26 comprises two photodetectors, the first detecting photodetector 54 and a second detecting photodetector 56. In this embodiment, the detecting means 26 generates a detection signal $S_d$ if an object 28 is detected by either the first detecting photodetector 54 or the second detecting photodetector 56. This type of arrangement is often referred to as an OR—OR configuration. The advantage of having two detecting photodetectors 54, 56 is that a wider area of the storage section 14 can be monitored. Also, by connecting the first detecting photodetector 54 and the second detecting photodetector 56 in an OR—OR configuration, the detecting means 26 is less likely to miss an object 28.

While any type of photodetector may be used for either of the detecting photodetectors 54, 56, or for either of the triggering photodetectors 50, 52, Honeywell FE7B series (trade mark) photodetectors have been found to be particularly useful. In particular the Honeywell FE7B-D photodetector, which is a diffuse scan photodetector, has been particularly useful. These types of photodetectors can monitor any area or volume and detect objects having a normal finish without requiring the detected object to have attached thereon a reflector of any kind.

As also shown in FIG. 3, the device 10 may be connected to a first side 72 of an aisle or aisle means 70. The aisle 70 has a second side 74 separated from the first side 72 such that the width Wa of the aisle 70 is marginally wiser than the width Wsc of the shopping cart 12. In this way, the aisle means 70 can guide the shopping cart 12 along a path shown generally as 78 in FIG. 3. It is apparent that the aisle means 70 could be a check-out aisle of a supermarket or grocery store with a cash register and cashier located at the first side 72 of the aisle 70.

In a further preferred embodiment of the invention, the detectors associated with the triggering means 20, which in FIG. 3 are shown as the first photodetector 50 and the second photodetector 52, detect objects positioned only between the first side 72 of the aisle 70 and an area substantially halfway (shown generally as 76) between the first side 72 and the second side 74. In this way, instead of sensing either of the front wheels 40 and either of the rear wheels 42, the triggering photodetectors 50, 52 will sense only a front wheel 44 and a rear wheel 46 on a first side 73 of the shopping cart 12, which is near the first side 72 of the aisle 70 and, therefore, near the trigger means 20.

In the embodiment where the triggering means 20 comprises photodetectors, such as triggering photodetectors 50 and 52, the distal range that the photodetectors 50, 52 sense can be limited by adjusting the focal length $L_{ft}$ of the photodetectors 50 and 52. Preferably, the focal length $L_{ft}$ is set at about or just less than one half the width Wa of the aisle 70. In the embodiment where the triggering means 20 comprises tactile sensors to sense a front wheel 40 and area wheel 42, the distance or area that the tactile sensors sense can be limited by not extending the sensitive part of the tactile sensor across the width Wa of the aisle 70.

The primary advantage of limiting the triggering means 20 in this way is that fewer articles of items passing through the aisle 70 will tend to trigger the triggering means 20 if its sensing area or distal range does not extend across the entire aisle 70. Accordingly, the number of false trigger signals $S_{tf}$ which could be sent will be decreased.

As with the triggering photodetector 50, 52, the detecting photodetectors 54, 56 may also be adjusted so that the focal length $L_{fd}$ of the detecting photodetectors 54, 56 is marginally less than the width Wa of the aisle 70. This is preferable for two reasons. Firstly, depending on the type of photodetector used, setting the focal length $L_{fd}$ at or marginally less than the width of the aisle will avoid having the detecting means 26 generate a false detection signal $S_{df}$ if the detecting means 26 detects the second side 74 of the aisle 70, rather than an object 28 on a storage section 14 of the shopping cart 12. Secondly, the detecting means 26 will be less likely to falsely detect an item or article, such as a person, standing between the shopping cart 12 and the second side 74 of the aisle 70.

In a further preferred embodiment of the invention, marking means 80 as shown in FIG. 3, are utilized to mark the predetermined position 24. The marking means 80 could simply comprise pieces of stick tape located along the first side 72 of the aisle 70. In this way, if the signalling means 30 signals that an object has been detected, a cashier or other person, can quickly look to determine if a shopping cart 12 was in the predetermined position 24 when the device 10 detected an object. If a shopping cart 12 was not in the predetermined position 24 then the cashier can quickly assess that the signalling means 30 incorrectly signalled that an object had been detected.

Figure 4:
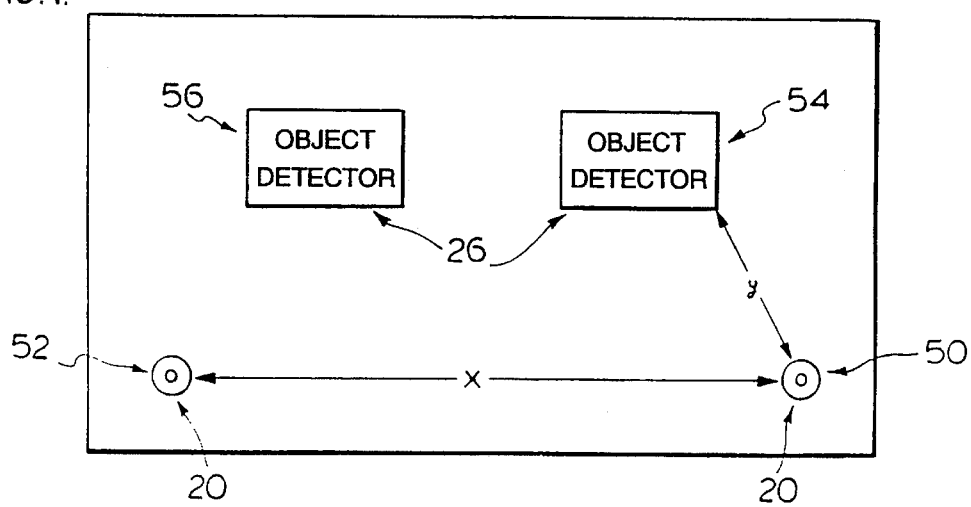
FIG. 4 is a front view of one embodiment of the present invention.

FIG. 4 shows a front view of the device 10 as it could be installed in a first side 72 of an aisle 70. The embodiment shown in FIG. 4 relates to the embodiment where the front and rear wheels, 40, 42 of the shopping cart 12 are to be detected. This is why the triggering photodetectors 50, 52 are shown lower than the detecting photodetectors 54, 56 of the detecting means 26. As can be seen, the two triggering photodetectors, 50, 52 are shown separated by a distance x. The distance x will vary depending on the the distance between wheels 40, 42 of shopping carts 12 used in a particular grocery store.

FIG. 4 shows detecting photodetectors 54, 56 as being a distance y from one of the first triggering photodetectors 50. As was the case with the triggering photodetectors 50, 52, the detecting photodetectors 54, 56 are configured and oriented such that they are aligned to detect objects on a storage section 14 when the shopping cart 12 is in the predetermine deposition 24.

Figure 5:
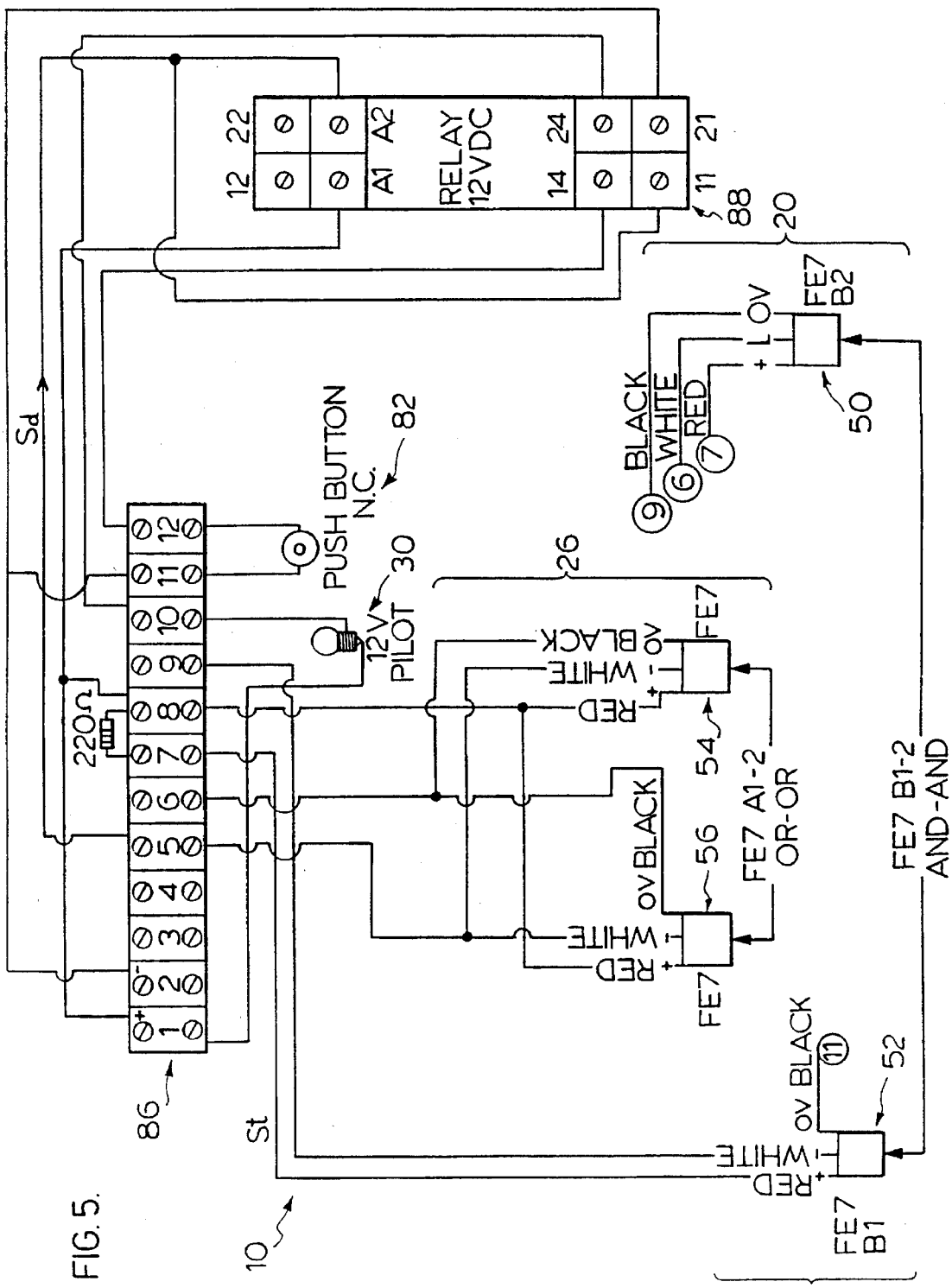
FIG. 5 is a circuit diagram of one embodiment of the present invention.
Figure 6A:
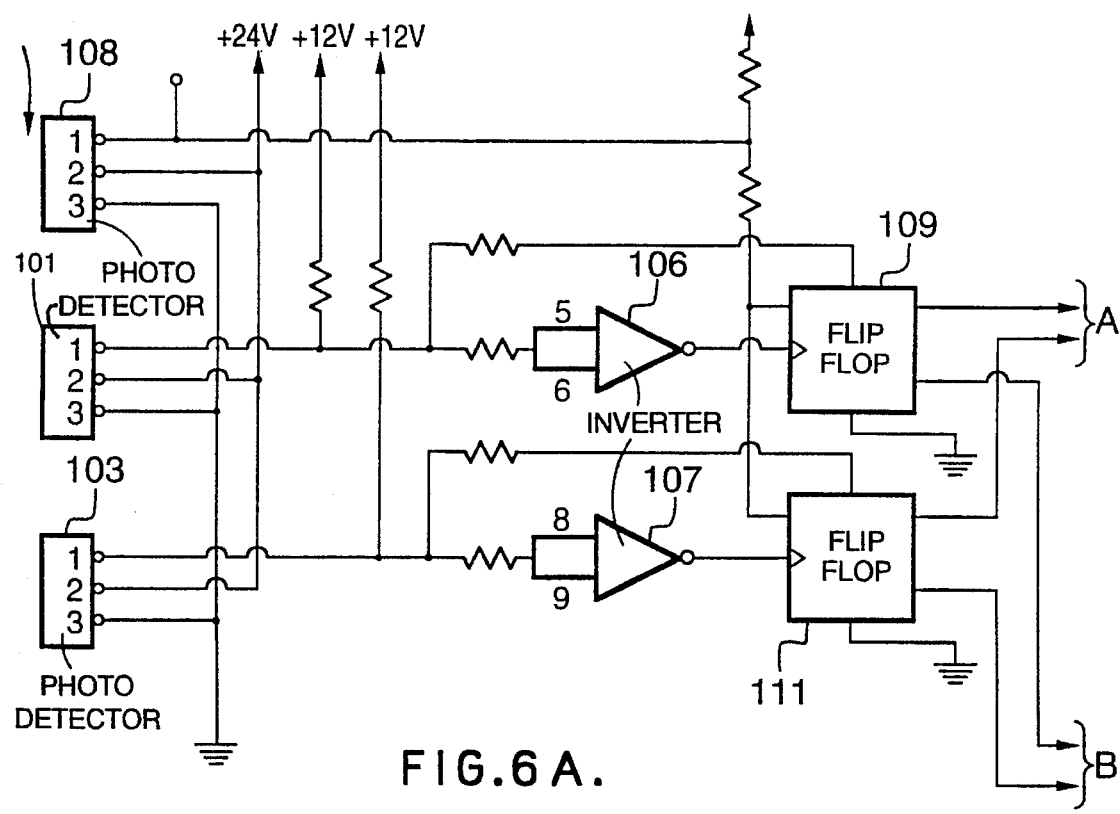
FIGS. 6A, 6B and 6C comprise the elements of a circuit diagram of a second, solid state embodiment of the present invention.
Figure 6B:
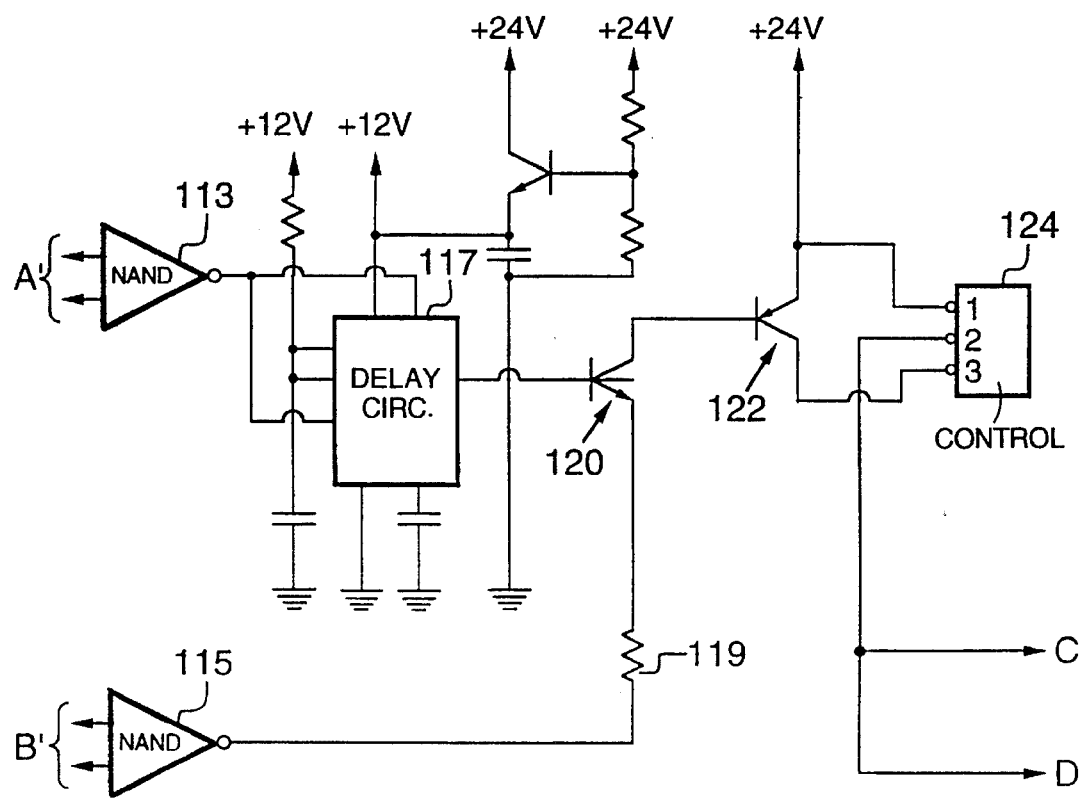
Figure 6C:
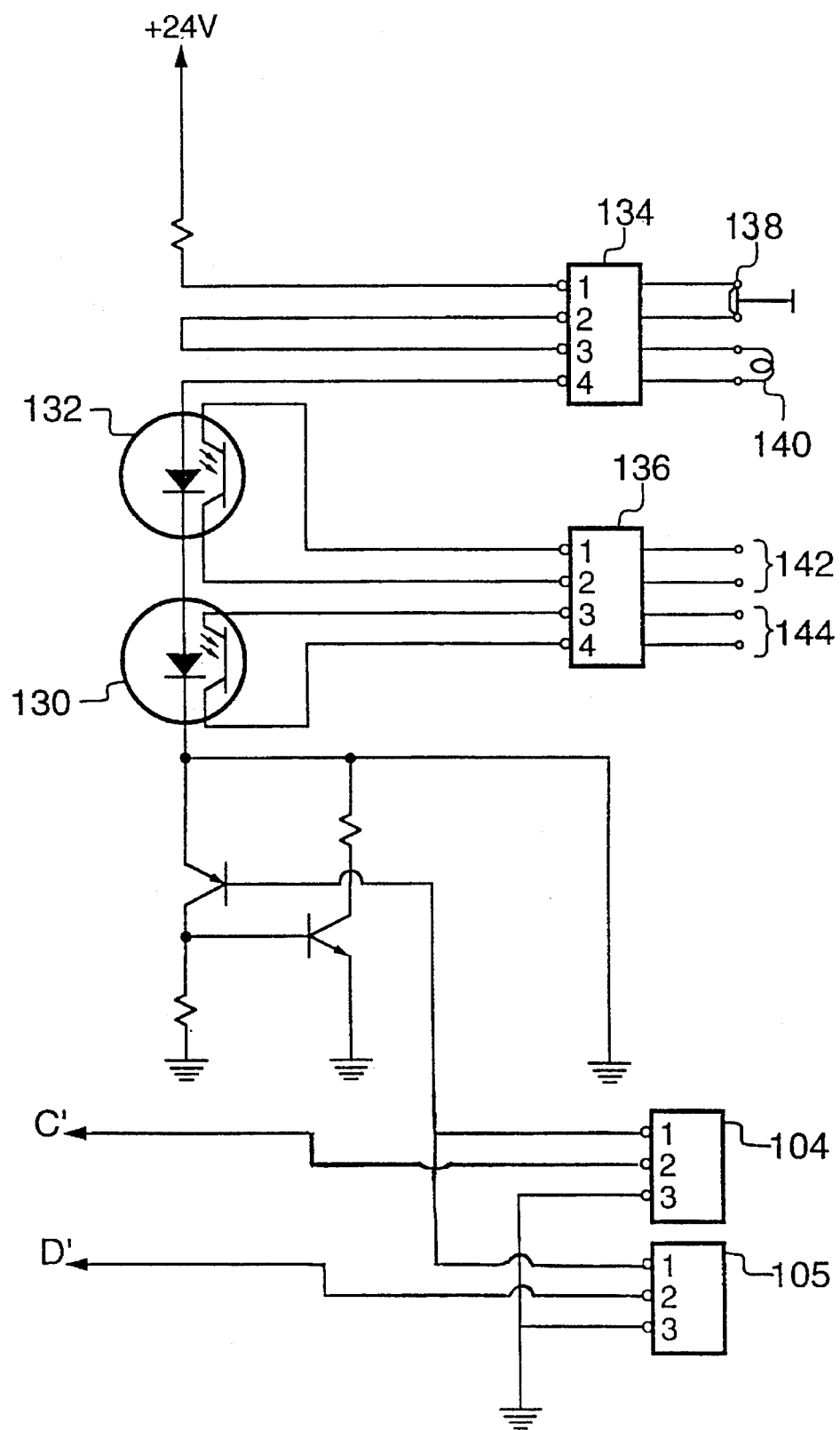
Figure 7:
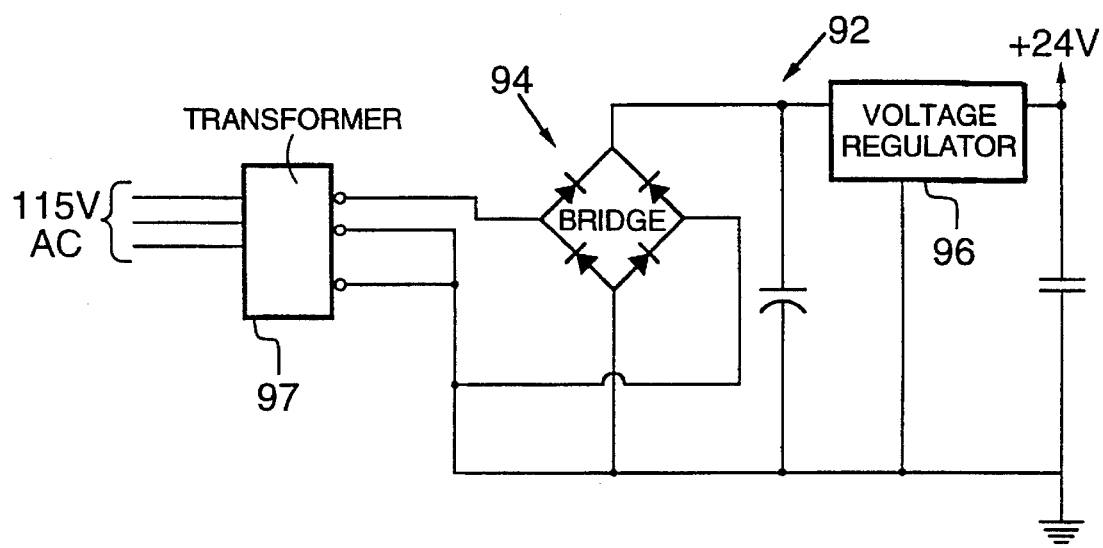
FIG. 7 is a circuit diagram of a power supply suited for the FIG. 5 and FIGS. 6A, 6B and 6C embodiments.

A preferred circuit diagram of a preferred embodiment of the invention is shown in FIG. 5. As shown in FIG. 5, the triggering means 20 comprises two Honeywell FE7 photodetectors 50, 52 which are connected in an AND—AND configuration. The detecting means, shown generally as 26, comprises two Honeywell FE7 photodetectors, 54, 56 connected in an OR—OR configuration.

The photodetectors 50, 52, 54, 56 are connected to a terminal strip 86. The numbers along the terminal strip refer to the location on the terminal strip to which each of the components is connected.

Locations 1 and 2 on the terminal strip 86 provide the power source for the device 10. The 220 ohm resistor across terminals 7 and 8 provide the required load for the operation of the photodetectors 50, 52, 54, 56. The signalling means 30 is shown generally as a 12 volt pilot light connected across locations 1 and 10 on the terminal strip 86. Also shown is a push button 82 which in this embodiment must be pressed by a human operator to deactivate the signalling means 30.

When the triggering photodetectors 50, 52 detect the two parts 22A, 22B of the shopping cart 12 substantially simultaneously, the triggering signal $S_t$ is sent to the terminal strip 86 which causes the detecting means 26 to operate. If either of the detecting photodetectors 54, 56 of the detecting means 26 detect an object, the detecting means 26 sends a detecting signal $S_d$ to the 12 volt relay 88. The relay 88 then causes the signalling means 30 to become activated and remain activated until the push button 82 is depressed.

Referring to FIGS. 6A, 6B, 6C and 7, this solid state circuit embodiment 90 is shown having three triggering, vehicle identifying detectors 101, 103 and 108, which are located in mutually spaced relation along the aisle or other prescribed vehicle monitoring zone. The mutual spacing between the respective vehicle identifying detectors 101, 103 and 108 along the aisle or monitoring zone is particularly based upon the configuration of a predetermined vehicle or cart, referred to as vehicle/cart.

The first one, detector 108, is located in an approach location, so as to be actuated by passage therepast of a portion of the vehicle/car, or other object. The actuation of detector 108 energizes portions of the logic means, flip flops 109, 111.

Subsequent actuation of the succeeding detectors 101 and 103 substantially simultaneously or in rapid sequence, within a predetermined delay, in reading upon or identifying with predetermined physical features that are characteristic of the vehicle/cart, such as a front and rear wheel thereof, enables the presence of predetermined infra-red reflective characteristics of the vehicle/cart to be verified, whereby vehicle/cart detector output signals are accepted by the system, to energize other portions of the system.

Each vehicle detector 101, 103, 108 consists of a Honeywell FE 7B (T.M.) infra-red photodetector, each having a pulsing IR output portion located closely adjacent an IR-sensitive receiver portion of the detector.

The IR-sensitive receiver portion of each detector is energized by IR pulses emitted by the adjacent transmitter portion of that detector, which are reflected back into the receiver by an IR-reflective surface of an adjacent object. When this occurs, an output signal is generated.

A power supply 92 (FIG. 7) for the circuit 90 comprises a diode bridge 94 providing a 24-volt DC output by way of voltage regulator 96. It has been found that a transformer 97 having a nominal output of 18-volts, serves well as a power source.

In addition to the illustrated three vehicle detectors 101, 103, 108 that survey the aisle or prescribed vehicle passage zone, the circuit 90 includes article detectors 104, 105 which scan the vehicle/cart when the detectors 104, 105 are energized.

The article detectors 104, 105 each comprise a Honeywell FE 7B (T.M.) IR photodetector, as described above.

An intervening circuitry comprises a logic circuit arrangement receiving inputs from the vehicle identifying detectors 101, 103, 108 in order to distinguish the presence of a vehicle or cart of predetermined side-view characteristics, e.g. a shopping cart conforming to predetermined, preselected IR-reflective characteristics that are distinguishable by the vehicle detectors 108, 101, 103, over the presence of other IR-reflective surfaces such as a person, baby carriage, etc.

The signalled presence of a vehicle conforming to a predetermined identification profile then serves, by way of the logic circuit, to energize the article detectors 104, 105, so as to scan the vehicle or cart for objects.

The interposed logic circuitry comprises a circuit arrangement having invertors 106, 107, the respective outputs of which connect with a pair of flip flops 109, 111. The flip flops 109, 111 are energized by an output from the vehicle detector 108 upon the initial detection by detector 108 of a portion of a vehicle/cart or other object, at the "upstream" location of the detector 108.

The flip flops 109, 111 introduce a predetermined delay into the logic circuit, to permit a slight delay between the outputs of the two detectors 101, and 103.

The output from flip flops 109, 111 ensure that a signal output initiated by the detectors 101, 103 is transmitted by the logic circuit only when all three of the vehicle/cart detectors 108, 101, 103 are activated, and in that sequence.

The outputs from the flip flops 109, 111 connect respectively with a pair of NAND's 113, 115.

The output of NAND 113 connects with a delay circuit 117, and thence to one side of a transistor 120; the output of NAND 115 connecting through a ballast resistor 119 with the other input of transistor 120.

A delay circuit 117 provides the logic circuit with a window some one quarter to one half second within which an output from each vehicle/cart detector 101, 103 can be received.

The output of transistor 120 connects with power switch 122 that is connected through a "set-up" and "run" control box 124 and thence to the article detectors 104, 105.

In operation, with the circuit 90 energized with normal household voltage, through power supply 92, the vehicle detectors 101, 103, 108 are energized, to pulse IR light across the aisle or other prescribed vehicle passage being monitored.

The advent of an object past detector 108 generates an output, to energize the flip flops 109, 111 that form a part of the logic circuit.

The vehicle detectors 101, 103, are located so as to provide substantially simultaneous or rapidly sequential detection of preselected target parts of a prescribed vehicle/cart, conforming with the predetermined IR-reflection pattern, such as a front and a rear wheel of the vehicle/cart.

The logic circuit invertors 106, 107 being both energized, by the outputs of outputs of detectors 101, 103 provide their outputs to flip flops 109, 111.

The flip flops 109, 111 are initially energized by the output from vehicle detector 108. On the detection of the passage of a vehicle/cart vehicle detectors 101, 103 provide outputs, causing outputs from the invertors 106, 107 to the NAND's 113, 115.

The NAND 113 energizes delay 117, which energizes one side of the transistor 120. If, within the pre-set period, of delay 117 (such as one half second), the second one of the two vehicle/cart detectors signals the presence of a prescribed shopping cart, then both sides of the logic circuit become energized.

The NAND 115 being energized, thereby energizes the other input side of transistor 120. The transistor 120 then provides an output, to energize the power switch 122, thereby switching on the object detectors 104, 105.

In the event that the incoming vehicle or object is a person, shopping bag, baby carriage etc., or approaches the system from the opposite direction, to trigger a first one of the vehicle detectors 101, 103, 108, the incorrect sequence or other lack of conformity of the signals generated by the incoming object with the prescribed sequence of signal generation, or the generation of some of the sequential signals outside the prescribed delay frame of delay circuit 117 will mean that a second or third signal from a second or third detector of the group 101, 103, 108 will not be accepted by the logic circuit, and the system will not be fully activated, and thus will provide no output.

In this circumstance the NAND 115 will not be energized, the transistor 120 will not be switched on, and the object detectors 104, 105 will not be energized, and will remain inactive.

Under normal operation of a shopping cart scanner according to the present invention, upon satisfactory identification by the detectors 108, 101, 103 of a cart conforming with the predetermined and specified cart characteristics, as validated by the logic circuit, the object detectors 104, 105 are the energized, to scan the cart for objects, such as items located on the bottom tray.

The outputs from object detector 104, 105, respectively terminals 104/1 and 105/1 are both connected through opto-isolators 130, 132 to junction boxes 134, 136.

On the junction box 134, terminals 134/1 and 134/2 are connected with a push-button, normally-on switch 138; the terminals 134/3 and 134/4 are connected with an indicator light 140.

Actuation of the push-button switch 138 turns off and re-sets the system. This includes the turning off of the indicator light 140.

The junction box 136, terminals 136/1 and 136/2, and 136/3 and 136/4 are connected with cash registers or other accounting or detection system devices, not shown.

The opto-isolators 130, 132 each comprise an LED combined with a photo-transistor.

Upon energization of either of the object detectors 104, 105, by the detection of an object or objects upon the cart/vehicle, the opto-isolators 130, 132 are switched on, and the junction boxes 134, 136 are energized.

The terminals of junction box 136 may be connected in controlling relation with one or more cash registers, so as to effectively close the register and prevent any further transaction until the alarm state of the system is nullified by depressing push button switch 138.

The junction box 136 may also be connected so as to bring into action a closed circuit TV camera or other surveillance device, such as a remote camera, to afford integrity checks on the system.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

We claim:

1. An object detection device for detecting objects located on a storage section of a moving shopping cart comprising:

cart detection and identifying means comprising diffuse beam energy emitting and receiving signalling means located on one side of an aisle along which the cart passes, having a first said signalling means positioned to register the presence of a predetermined first cart portion; a second said signalling means located in spaced relation along the aisle from said first signalling means, to register the presence of a predetermined second cart position;

logic circuit means including a delay circuit receiving the output from said first and second signalling means, to discriminate the presence of a cart from other passing objects;

object detection means located between said first and said second signalling means, to detect an object on a storage section of said cart and connect in energized relation by said logic circuit means, for energization thereby upon the presence of a cart being established by said logic circuit means, whereby false actuation of said object detection means is substantially precluded.

2. The device as set forth in claim 1 said first and said second signalling means each comprising a diffuse beam I/R emitter/receiver.

3. The device as defined in claim 2 said object detection means including a signalling means operable to receive an object detection signal and to signal that an object has been detected.

4. The device as defined in claim 1 wherein one of said predetermined portions of the shopping cart is a front wheel of the shopping cart and another of said predetermined portions of the shopping cart is a rear wheel of the shopping cart.

5. The device as defined in claim 4 wherein said cart detection and identifying means includes a first photodetector located and oriented to detect the front wheel and a second photodetector located and oriented to detect the rear wheel; and wherein the first photodetector and the second photodetector must detect the respective front and rear wheels substantially simultaneously in order to distinguish the presence of said cart.

6. The device of claim 1 wherein the storage section is a lower storage section.

7. The device as defined in claim 6 wherein the detecting means comprises a first I/R photodetector.

8. The device as defined in claim 7 further comprising a signalling means operable to receive a detection signal and to signal that an object has been detected.

9. The device as defined in claim 8 wherein said signalling means comprises a video camera which begins taping in response to the detection signal.

10. The device as defined in claim 9 wherein said signalling means comprises an audio or a visual indicator, or both.

11. The device as defined in claim 8 wherein the device detects objects on said storage section while said cart having a predetermined width is moving through an aisle having a first side and a second side; and wherein the aisle is marginally wider than said predetermined width.

12. The device as defined in claim 11 wherein said object detection means further comprises a second photodetector and wherein the detecting means generates a detection signal if an object is detected by either the second photodetector or the first photodetector or both.

13. The device as defined in claim 12 wherein the device is installed on only one side of the aisle and said cart detection and identifying means senses objects positioned only between said one side and an area substantially halfway between the one side and the aisle opposite side;

wherein the shopping cart has a first side near the one side of the aisle; and wherein the front wheel is a front wheel on said one side of the shopping cart and the rear wheel is a rear wheel on said one side of the shopping cart.

14. The device as define din claim 13 wherein said first and second cart detection and identifying means and the first and second object detection signalling means each has a focal length and wherein the focal length of each of the first and second cart detection and identifying means is about, or marginally less than, half the width of the aisle and wherein the focal length of each of the first and second object detection means is about, or marginally less than, the width of the aisle.

15. An object detection system for detecting objects on a storage section of a moving shopping cart comprising:

a cart detection and identifying means comprising a first cart detector operable to detect a first part of the shopping cart entering a first area and a second cart detector operable to detect a second part of the shopping cart entering a second area spatially separated from the first area;

logic circuit means including a delay circuit, to discriminate the presence of a cart within the area;

an object detecting means for detecting the presence of an object on the storage section of the shopping cart;

wherein when the first cart detection detects that the first part of the shopping cart is entering the first area at substantially the same time as the second part of the shopping cart is entering the second area; the logic circuit means energizing the object detecting means to operate; and wherein the object detecting means generates a detection signal if the object detecting means detects an object.

16. The system as defined in claim 15 further comprising aisle means marginally wider than a width of the shopping cart to guide the shopping cart along a path; and wherein the cart detection and identifying means is associated with the aisle means such that as the shopping cart moves along the path no parts of the shopping cart enter the first area and the second area at substantially the same time other than the first part and the second part, respectively.

17. The system as defined in claim 15 wherein the first part of the shopping cart is a front wheel of the shopping cart and the second part of the shopping cart is a rear wheel of the shopping cart such that the logic circuit means will cause the object detecting means to detect objects on the storage section when the cart detection means detects the front wheel entering the first area at substantially the same times as the second cart detection means detects the rear wheel entering the second area.

18. The system as defined in claim 17 further comprising a signalling means operable to receive the object detection signal and to emit an observable signal that an object has been detected.

19. The system as defined in claim 18 further comprising aisle means marginally wider than a width of said shopping cart:

wherein the cart detecting means comprises a first detecting photodetector having a focal length and a second detecting photodetector having a focal length;

wherein the focal length of the first and second cart detecting photodetectors is about, or marginally less than, the width of the aisle means;

wherein the first area and the second area each extends no further from the first and second cart detectors than about half the width of the aisle means; and wherein the front wheel is a front wheel located near the cart detecting means and the rear wheel is a rear wheel located near the cart detecting means.

20. An object detection combination for detecting the presence of an object located upon a predetermined transportation vehicle passing through a predetermined passage, said combination comprising vehicle monitoring and identifying means positioned adjacent said passage, to one side thereof, in passage monitoring relation, to detect and identify the presence of a vehicle; object monitoring means located adjacent the passage to monitor said vehicle for objects located thereon, and to provide an output signal on detecting the presence of said object; and logic circuit means to establish the identity of said vehicle, and to energize said object monitoring means thereafter.

21. The object detection combination as set forth in claim 20, said logic circuit means being connected in controlling relation with power supply means energizing said object monitoring means; said logic circuit means being connected in signal receiving relation with said vehicle monitoring means, to ensure the presence of a vehicle possessing said detection characteristics prior to operation of said object monitoring means.

22. The object detection combination as set forth in claim 21, said vehicle monitoring means including at least two first infra-red detectors located along said passage in predetermined mutually spaced relation, sited to register upon predetermined portions of said vehicle; and switch means responsive to said logic means and connected in power supply controlling relation with said object monitoring means.

23. The combination as set forth in claim 22, said logic means including delay means to limit the period of energization of said logic means to receive an input signal from a said vehicle detector.

24. The combination as set forth in claim 21, said vehicle monitoring means including an infra-red third detector located adjacent two of said first detectors, being connected in energy controlling relation with said logic circuit, to enable said logic circuit upon the advent of a vehicle opposite said third detector.

25. An object detection combination having a circuit for detecting the presence of an object located upon a transportation vehicle located within a predetermined passage, said circuit comprising vehicle monitoring and identifying first detection means positioned adjacent said passage, in passage monitoring relation; object monitoring second detection means located adjacent said passage to monitor said vehicle for objects located thereon; power supply means to energize said second detection means, and switch means responsive to said first detection means connected in power supply controlling relation with said second detection means.

26. The combination as set forth in claim 25, said vehicle monitoring and verifying means including logic circuit means in output-controlling relation with said second detection means, said first detection and verifying means including at least two infra-red detectors arranged in mutually spaced predetermined relation along said passage, being sited to register upon predetermined portions of a vehicle possessing predetermined infra-red reflecting characteristics, said logic circuit means receiving output signals from said first detectors, in controlling relation with said second detection means.

27. The combination as set forth in claim 26, said second detection means comprising at least one infra-red detector.

28. The combination as set forth in claim 26, said first detection means including three infra-red detectors, said logic circuit including sequence detection means to determine conformity of inputs thereto from said first detection means in a predetermined sequence, to ensure the presence of said vehicle in said passage.

29. An object detection combination having a first IR detector located in lateral scanning relation adjacent a restricted passage, to detect the presence of a cart in the passage; logic circuit means connected to receive an output from said first detector, to switch on the logic circuit means; second IR detector means comprising at least two mutually spaced apart IR detectors located adjacent the passage and on the side of said first detector means remote from a normally approaching cart, to receive diffused IR light reflected by two designated portions of a designated cart, upon location of said designated portions in front of said second detector means; said logic circuit means receiving outputs from said two IR second detector means; said logic circuit means identifying said two IR outputs from said designated cart, to provide an output in response thereto; trigger means, responsive to said output of said logic circuit means, connected in on-off controlling relation with third, object scanning IR detector means located in scanning relation adjacent said passage; said third IR detector means being located to scan said cart for said object; signal output means responsive to output from said third IR detector means, said signal output means including visual display means indicating the presence of an object detected by said object scanning means.

30. The detection combination as set forth in claim 29, said logic circuit means including flip flop means to distinguish operation of said two IR second detector means, and delay means providing a predetermined minor interval for actuation of both said second detector means, to substantially preclude actuation of said flip flop means in response to erroneous signals received due to the presence of an object other than said designated cart.

31. The detection combination as set forth in claim 30, said logic circuit having two circuit inverters energized by the outputs of said two IR second detectors; flip flops receiving the outputs of said two circuit inverters; two NAND circuit means receiving the outputs of said inverters, said NAND circuit means providing input signals to said delay means; said trigger means comprising a transistor connected to receive two enabling pulses, to trigger said third IR object scanning means.

32. The object detection combination as set forth in claim 30, said signal output means including opto-isolators connecting said third IR detector means with normally-on push button means and an indicator light, whereby manual actuation of said push button opens the circuit of said opto-isolaters, to de-energize said light and re-set said object detection combination.

* * * * *

UNITED STATES PATENT AND TRADEMARK OFFICE
CERTIFICATE OF CORRECTION

PATENT NO. : 5,485,006

DATED : January 16, 1996

INVENTOR(S) : James F. Allen, et al.

It is certified that error appears in the above-indentified patent and that said Letters Patent is hereby corrected as shown below:

On title page,
Item,

[30]     Foreign Application Priority Data

Feb. 5, 1993 [CA]   Canada .............2,088,894

Column 1, line 29, "face" should read --fact--.

Column 3, line 52, "incorporated" should read --incorporating--.

Column 6, line 64 "are 62" should read --area 62--.

Column 8, line 44, "predetermine deposition 24" should read --predetermined postion 24--.

Column 13, line 1, "define din" should read --defined in--.

Column 13, line 45, "times" should read --time--.

Signed and Sealed this

Third Day of December, 1996

Attest:

BRUCE LEHMAN

Attesting Officer      Commissioner of Patents and Trademarks